United States Patent
Deshpande et al.

(10) Patent No.: US 10,417,197 B2
(45) Date of Patent: *Sep. 17, 2019

(54) IMPLEMENTING A SECONDARY STORAGE DENTRY CACHE

(71) Applicant: International Business Machines Corporation, Armonk, NY (US)

(72) Inventors: Umesh Deshpande, San Jose, CA (US); Wayne A. Sawdon, San Jose, CA (US); Vasily Tarasov, Port Jefferson Station, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/373,442

(22) Filed: Apr. 2, 2019

(65) Prior Publication Data
US 2019/0227996 A1 Jul. 25, 2019

Related U.S. Application Data
(63) Continuation of application No. 15/490,730, filed on Apr. 18, 2017.

(51) Int. Cl.
| | | |
|---|---|---|
| G06F 12/00 | (2006.01) |
| G06F 13/00 | (2006.01) |
| G06F 16/188 | (2019.01) |
| G06F 9/455 | (2018.01) |
| G06F 3/06 | (2006.01) |
| G06F 16/172 | (2019.01) |
| G06F 16/178 | (2019.01) |

(52) U.S. Cl.
CPC .......... *G06F 16/188* (2019.01); *G06F 3/0613* (2013.01); *G06F 3/0643* (2013.01); *G06F 3/0679* (2013.01); *G06F 9/45545* (2013.01); *G06F 16/172* (2019.01); *G06F 16/1787* (2019.01); *G06F 2009/45579* (2013.01); *G06F 2201/80* (2013.01); *G06F 2212/217* (2013.01)

(58) Field of Classification Search
None
See application file for complete search history.

(56) References Cited

U.S. PATENT DOCUMENTS

| | | |
|---|---|---|
| 7,249,219 B1 | 7/2007 | Mowat et al. |
| 8,549,222 B1 | 10/2013 | Kleiman et al. |
| 9,026,737 B1 | 5/2015 | Armangau et al. |

(Continued)

OTHER PUBLICATIONS

List of IBM Patents or Patent Applications Treated as Related.
(Continued)

*Primary Examiner* — Sean D Rossiter
(74) *Attorney, Agent, or Firm* — Zilka-Kotab, P.C.

(57) ABSTRACT

A computer-implemented method according to one embodiment includes identifying an accessing of a file within an operating system, checking an in-memory cache for path information associated with the file, checking an external cache for the path information associated with the file, conditionally retrieving the path information associated with the file by performing a file system lookup and adding the path information associated with the file to the in-memory cache and the external cache, returning the path information, and reorganizing the external cache to put file information that is frequently accessed together in a single block or adjacent blocks.

18 Claims, 8 Drawing Sheets

(56) References Cited

U.S. PATENT DOCUMENTS

| | | |
|---|---|---|
| 9,268,702 B2 | 2/2016 | Bilas et al. |
| 10,318,649 B2 | 6/2019 | Deshpande et al. |
| 2003/0191745 A1 | 10/2003 | Jiang et al. |
| 2004/0078623 A1 | 4/2004 | Totolos |
| 2007/0067256 A1 | 3/2007 | Zayas et al. |
| 2009/0307241 A1 | 12/2009 | Schimunek et al. |
| 2011/0246491 A1 | 10/2011 | Clash et al. |
| 2011/0296115 A1 | 12/2011 | Speight et al. |
| 2013/0097387 A1 | 4/2013 | Sanchez Martin et al. |
| 2015/0161015 A1 | 6/2015 | Kumarasamy et al. |
| 2015/0220481 A1 | 8/2015 | Tanimoto |
| 2015/0356078 A1 | 12/2015 | Kishimoto et al. |
| 2016/0042005 A1 | 2/2016 | Liu et al. |
| 2016/0042090 A1 | 2/2016 | Mitkar et al. |
| 2016/0179559 A1 | 6/2016 | Senda |
| 2016/0203203 A1 | 7/2016 | Lord |
| 2016/0261694 A1 | 9/2016 | Clash et al. |
| 2017/0097941 A1 | 4/2017 | Graves, Jr. et al. |
| 2018/0181316 A1 | 6/2018 | Suzuki et al. |
| 2018/0239674 A1 | 8/2018 | Hutchison et al. |
| 2018/0300355 A1 | 10/2018 | Deshpande et al. |

OTHER PUBLICATIONS

Tseng et al., "An Energy-Efficient Virtual Memory System with Flash Memory as the Secondary Storage," ISLPED'06 Proceedings of the 2006 International Symposium on Low Power Electronics and Design, 2006, pp. 418-423.

Spillane et al., "Exporting Kernel Page Caching for Efficient User-Level I/O," IEEE 26th Symposium on Mass Storage Systems and Technologies (MSST), 2010, pp. 1-13.

Pritchett et al., "SieveStore: A Highly-Selective, Ensemble-level Disk Cache for Cost-Performance," ACM SIGARCH Computer Architecture News, vol. 38, No. 3, 2010, pp. 163-174.

Ross et al., "PVFS: A Parallel File System for Linux Clusters," Proceedings of the 4th annual Linux Showcase and Conference, 2000, pp. 1-10.

Linder et al., "Scalability of the Directory Entry Cache," Ottawa Linux Symposium, 2002, pp. 289-302.

McKenney et al., "Scaling Dcache With RCU," Linux Journal, 2004, pp. 1-16.

Tsai et al., "How to Get More Value From Your File System Directory Cache," Proceedings of the 25th Symposium on Operating Systems Principles, ACM, 2015, pp. 1-16.

Ghemawat et al., "The Google File System," ACM SIGOPS operating systems review. vol. 37, No. 5, 2003, pp. 1-15.

Deshpande et al., U.S. Appl. No. 15/490,730, filed Apr. 18, 2017.

Non-Final Office Action from U.S. Appl. No. 15/490,730, dated Sep. 12, 2018.

Notice of Allowance from U.S. Appl. No. 15/490,730, dated Jan. 30, 2019.

IMPLEMENTING A SECONDARY STORAGE DENTRY CACHE

BACKGROUND

The present invention relates to file access, and more specifically, this invention relates to performing lookups utilizing a virtual file system (VFS).

In predetermined operating systems (e.g., UNIX-like operating systems, etc.), when a file is accessed by a user for the first time the virtual file system (VFS) layer may go through each component of the file path and may construct dentry objects that tie the path components to the corresponding inodes. This procedure is called a lookup. Current lookup operations require multiple I/O requests to the underlying slow storage. E.g., to lookup "/tmp/foo/bar", three or more I/O requests may be needed (one for every path component).

As a result, lookups are slow and the cost of lookup is a dominant cost for many file system instances. Current attempts to address these issues have high memory cost and expansion size limitations.

SUMMARY

A computer-implemented method according to one embodiment includes identifying an accessing of a file within an operating system, checking an in-memory cache for path information associated with the file, checking an external cache for the path information associated with the file, conditionally retrieving the path information associated with the file by performing a file system lookup and adding the path information associated with the file to the in-memory cache and the external cache, returning the path information, and reorganizing the external cache to put file information that is frequently accessed together in a single block or adjacent blocks.

According to another embodiment, a computer program product for implementing a secondary storage dentry cache includes a computer readable storage medium having program instructions embodied therewith, wherein the computer readable storage medium is not a transitory signal per se, and where the program instructions are executable by a processor to cause the processor to perform a method comprising identifying an accessing of a file within an operating system, utilizing the processor, checking an in-memory cache for path information associated with the file, utilizing the processor, checking an external cache for the path information associated with the file, utilizing the processor, conditionally retrieving the path information associated with the file by performing a file system lookup and adding the path information associated with the file to the in-memory cache and the external cache, utilizing the processor, returning the path information, utilizing the processor, and reorganizing the external cache to put file information that is frequently accessed together in a single block or adjacent blocks, utilizing the processor.

A system according to another embodiment includes a processor, and logic integrated with the processor, executable by the processor, or integrated with and executable by the processor, where logic is configured to identify an accessing of a file within an operating system, check an in-memory cache for path information associated with the file, check an external cache for the path information associated with the file, conditionally retrieve the path information associated with the file by performing a file system lookup and add the path information associated with the file to the in-memory cache and the external cache, return the path information, and reorganize the external cache to put file information that is frequently accessed together in a single block or adjacent blocks.

Other aspects and embodiments of the present invention will become apparent from the following detailed description, which, when taken in conjunction with the drawings, illustrate by way of example the principles of the invention.

DETAILED DESCRIPTION

Figure 1:
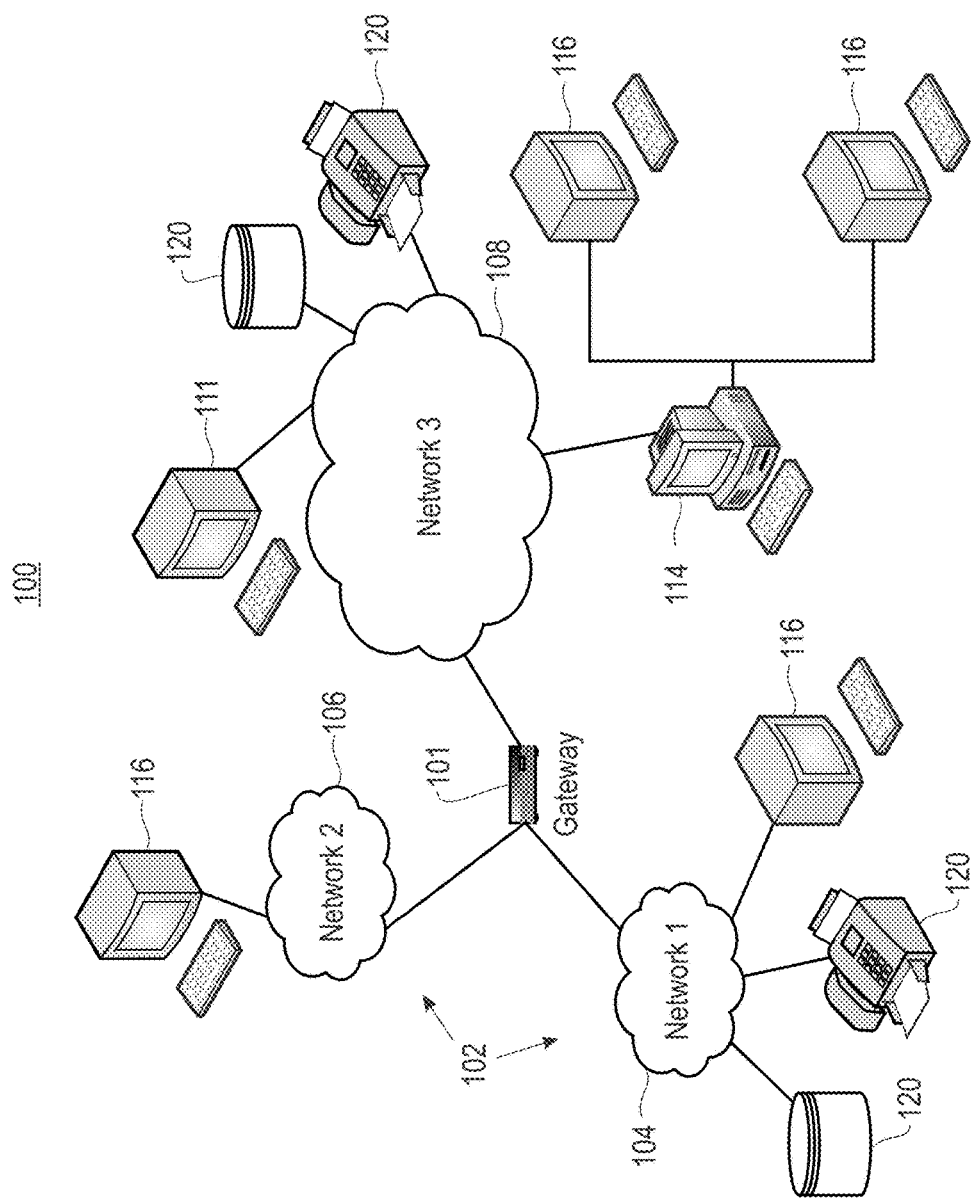
FIG. 1 illustrates a network architecture, in accordance with one embodiment.

The following description discloses several preferred embodiments of systems, methods and computer program products for implementing a secondary storage dentry cache. Various embodiments provide a method to check an external cache, in addition to in-memory cache, for path information when a file is accessed.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for implementing a secondary storage dentry cache.

In one general embodiment, a computer-implemented method includes identifying an accessing of a file within an operating system, checking an in-memory cache for path information associated with the file, checking an external cache for the path information associated with the file, conditionally retrieving the path information associated with the file by performing a file system lookup and adding the path information associated with the file to the in-memory cache and the external cache, and returning the path information.

In another general embodiment, a computer program product for implementing a secondary storage dentry cache includes a computer readable storage medium having program instructions embodied therewith, wherein the computer readable storage medium is not a transitory signal per se, and where the program instructions are executable by a processor to cause the processor to perform a method comprising identifying an accessing of a file within an operating system, utilizing the processor, checking an in-memory cache for path information associated with the file, utilizing the processor, checking an external cache for the path information associated with the file, utilizing the processor, conditionally retrieving the path information associated with the file by performing a file system lookup and adding the path information associated with the file to the in-memory cache and the external cache, utilizing the processor, and returning the path information, utilizing the processor.

In another general embodiment, a system includes a processor, and logic integrated with the processor, executable by the processor, or integrated with and executable by the processor, where logic is configured to identify an accessing of a file within an operating system, check an in-memory cache for path information associated with the file, check an external cache for the path information associated with the file, conditionally retrieve the path information associated with the file by performing a file system lookup and add the path information associated with the file to the in-memory cache and the external cache, and return the path information.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
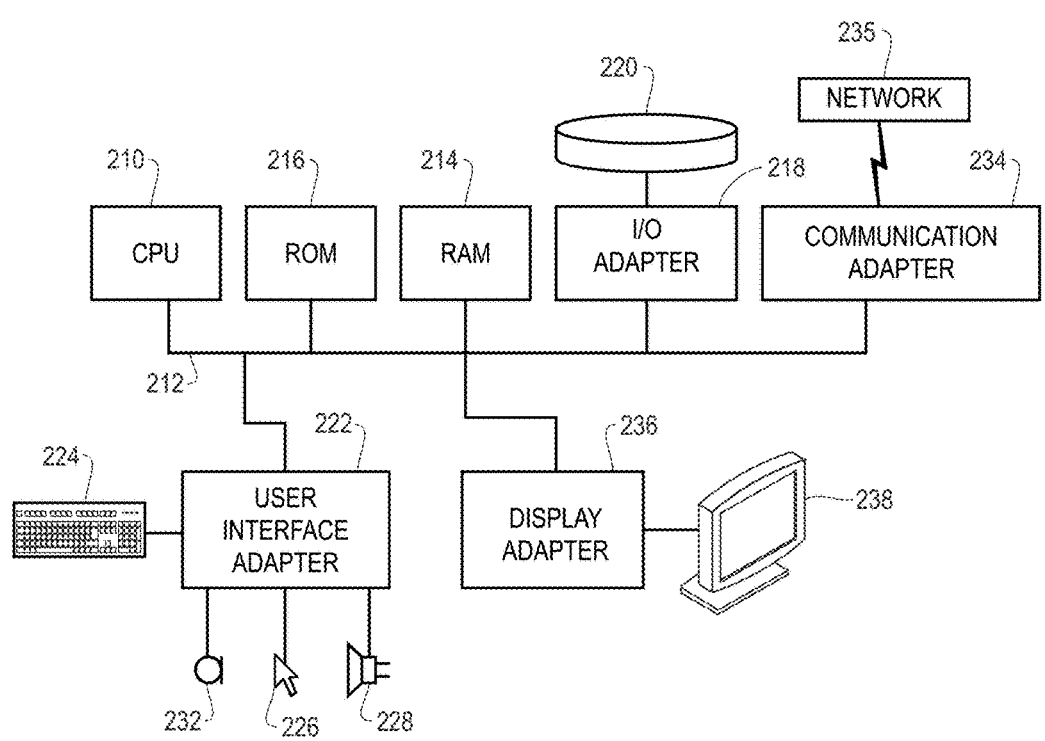
FIG. 2 shows a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using XML, C, and/or C++ language, or other programming languages, along with an object oriented programming methodology. Object oriented programming (OOP), which has become increasingly used to develop complex applications, may be used.

Figure 3:
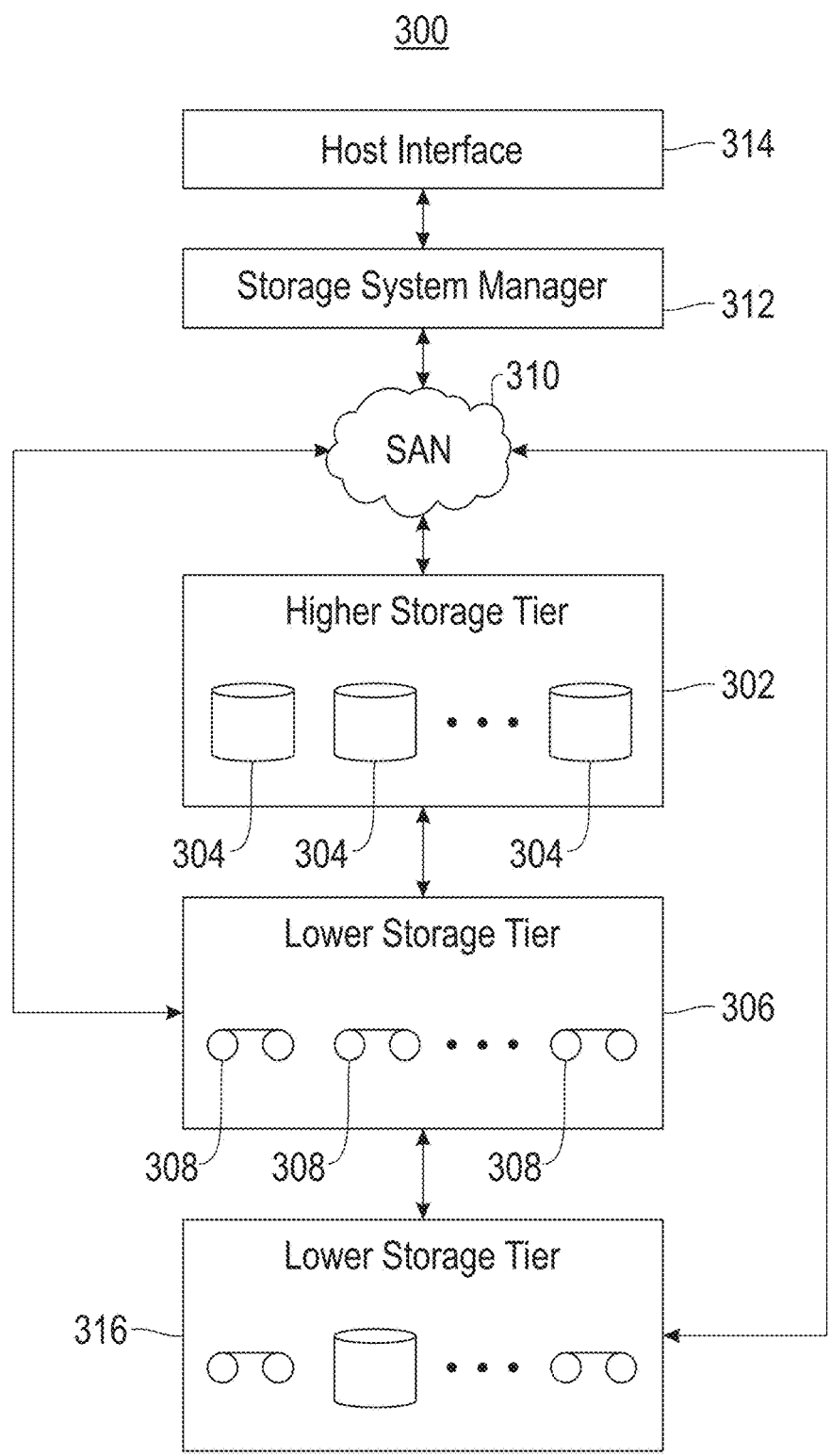
FIG. 3 illustrates a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

Figure 4:
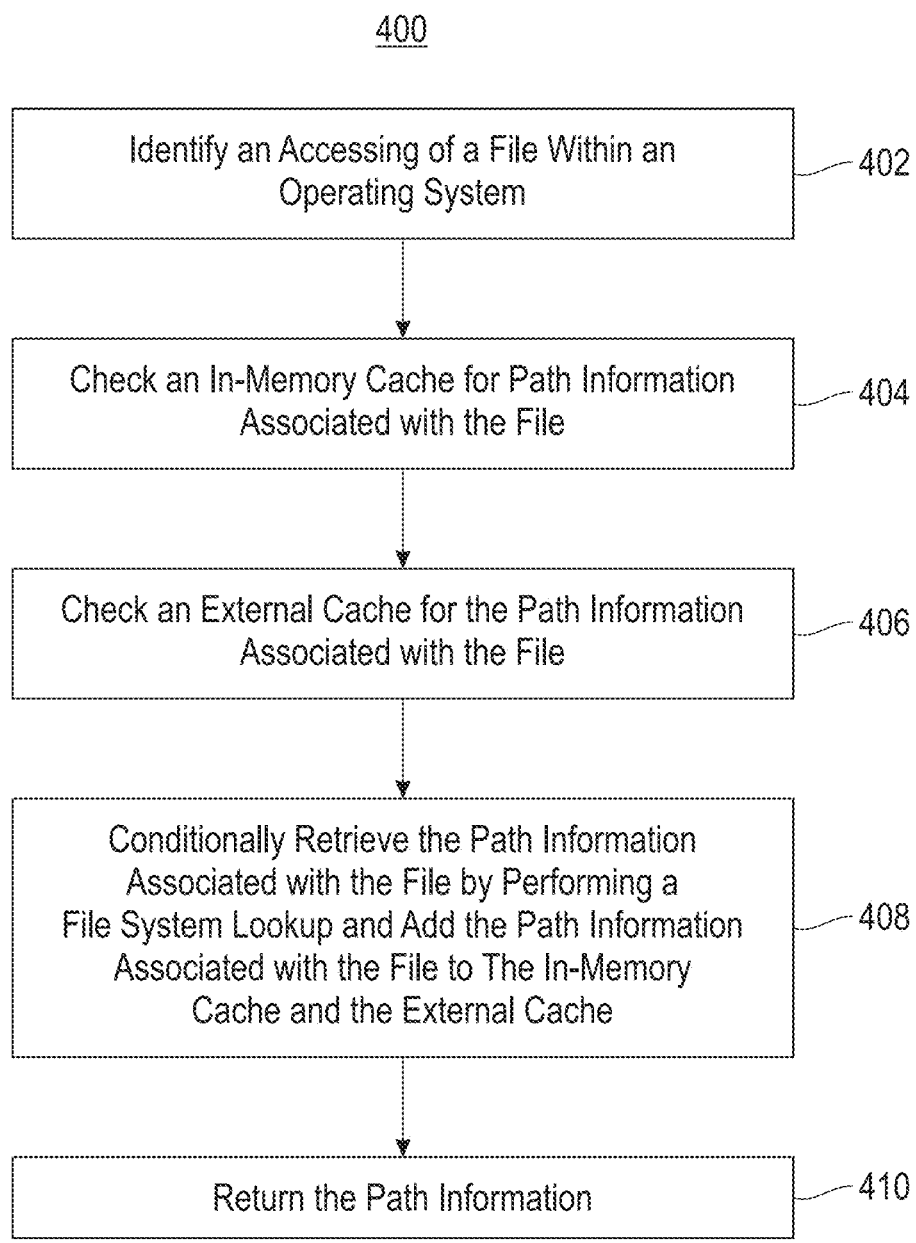
FIG. 4 illustrates a method for implementing a secondary storage dentry cache, in accordance with one embodiment.

Now referring to FIG. 4, a flowchart of a method 400 is shown according to one embodiment. The method 400 may be performed in accordance with the present invention in any of the environments depicted in FIGS. 1-3 and 5-6, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 may initiate with operation 402, where an accessing of a file within an operating system is identified. In one embodiment, the accessing may include the performing of an operation on the file (e.g., a read, a write, a metadata update, etc.). In another embodiment, the operating system may include a Unix®-based operating system or a Unix®-like operating system (e.g., a Linux®-based operating system, etc.). In yet another embodiment, the identifying may be performed by a virtual file system (VFS) within a hardware computing device.

Additionally, as shown in FIG. 4, method 400 may proceed with operation 404, where an in-memory cache is checked for path information associated with the file. In one embodiment, the in-memory cache may include non-persistent memory within a system. For example, the in-memory cache may include random access memory (RAM) within the system. In another embodiment, the in-memory cache may store previously determined path information. For example, the in-memory cache may include path information determined during past lookups. In yet another embodiment, the in-memory cache may include an in-memory directory entry (dentry) cache.

Further, in one embodiment, the path information may include a dentry object for each component of the file path. For example, dentry objects may tie path components to corresponding inodes. In another embodiment, the VFS may detect when the file is accessed by the user and may construct directory entry (dentry) objects that tie path components to inodes within the system.

In another embodiment, the path information may include an inode. For example, the inode may include a data structure that stores metadata describing an object (e.g., the file, one or more directories containing the file, etc.). For instance, the inode of the file may include attributes of the file, a location of the file within one or more disk blocks, etc.

Further still, in one embodiment, the checking of the in-memory cache may be performed by the VFS. For example, the checking may be done as part of a lookup operation in response to the accessing of the file, as part of a translation of the file to an inode, etc.

Also, as shown in FIG. 4, method 400 may proceed with operation 406, where an external cache is checked for the path information associated with the file. In one embodiment, the external cache may be checked upon determining that the in-memory cache does not contain the path information associated with the file. In another embodiment, the external cache may be checked in parallel with the in-memory cache.

In addition, in one embodiment, the external cache may be local (e.g., included in the system containing the in-memory cache), or may be included in a device separate from the system containing the in-memory cache. For example, the external cache may be included in a dcache device separate from a main system device that contains the in-memory cache. In another embodiment, the external cache may include persistent memory. For example, the external cache may include flash memory, a solid state drive (SSD), etc. In yet another embodiment, the external cache may include an external dentry cache.

Furthermore, in one embodiment, the external cache may contain a mapping of an entire path to an inode for the file. This may enable the translation of the file to an inode in a single input/output (I/O) operation. In this way, lookup performance may be improved. In another embodiment, in-memory cache may be populated from the external cache during a reboot.

Further still, in one embodiment, the checking of the external cache may be performed by the VFS. For example, the checking may be done as part of a lookup operation in response to the accessing of the file, as part of a translation of the file to an inode, etc. In another embodiment, the in-memory cache and the external cache may be populated in response to file access by one or more users.

Also, as shown in FIG. 4, method 400 may proceed with operation 408, where the path information associated with the file is conditionally retrieved by performing a file system lookup and added to the in-memory cache and the external cache. In one embodiment, the path information may be retrieved by performing the file system lookup and added to the caches upon determining that the path associated with the file is not found in either the in-memory cache or the external cache. For example, the file system lookup may be performed by constructing dentry objects for each component of the path for the file, where the dentry objects tie the path components to the corresponding inodes. In another embodiment, the file system lookup may include performing one or more I/O requests to disk storage. In another embodiment, the disk storage may include a hard disk drive (HDD) within the system. In yet another embodiment, the data retrieval from the disk storage may be slower than data retrieval from the external cache.

Additionally, in one embodiment, the retrieving of the path information may be performed by the VFS. In another embodiment, the path information retrieved as a result of the file system lookup may be stored in the in-memory cache as well as the external cache.

Further, as shown in FIG. 4, method 400 may proceed with operation 410, where the path information is returned. In one embodiment, the path information may be returned by the VFS to the operating system. In another embodiment, returning the path information may include returning an inode for the file. For example, the inode may be used by the operating system to access the file. More specifically, metadata from the inode may be used to determine a location of stored data representing the file. In yet another embodiment, when it is determined that the path associated with the file is not found in either the in-memory cache or the external cache, a file system lookup may be performed, and information from the lookup may be added to one or more of the in-memory cache and the external cache.

Further still, in one embodiment, the VFS may be modified to check for entries in the external cache. For example, the operating system may implement a VFS to abstract access to specific file systems. The VFS may also be modified to allow file lookups without looking up individual path components. For example, a lookup method may be called with a complete file path as an argument. In another embodiment, one or more internal non-looked-up dentries may be implemented for intermediate components of a path. For example, the internal non-looked-up dentries may correspond to directories on which a lookup was not performed, but where a lookup was performed on files in those directories.

Also, in one embodiment, the VFS may be bypassed, and the file system may be implemented at a system call level. In another embodiment, the external cache may be implemented using a stackable file system to avoid kernel modifications. In yet another embodiment, the external cache may be generic, such that each of a plurality of different file systems may utilize the external cache.

In this way, in-memory cache may be extended to an external cache in secondary storage.

To reduce lookup times, operating systems may cache dentries and inodes in an in-memory dentry cache in the main memory of a system. The dentry cache may be implemented as a hash table that maps a (parent_inode, "child_name") tuple to the inode.

In one embodiment, a file system may maintain a hierarchy of directories. E.g., in Unix®, file F may be located in directory D, which in turn is in directory C, which is in directory B, which is in A. Conventionally, such path may be designated as /A/B/C/D/F. In another embodiment, to perform an operation on file F (e.g., read/write the data or perform metadata update), traditional file systems may first translate the path (e.g., /A/B/C/D/F) to the inode (also called a vnode), which may contain metadata for the file, including the locations of data blocks for the file in data storage. The procedure of translating file path to inode is called a lookup.

Additionally, in one embodiment, performing the lookup may be enhanced by caching lookup results on an external cache (e.g., a secondary storage device such as an SSD, etc). This external cache may include an auxiliary dentry cache and may reside on a dcache device. In another embodiment, the external cache may be reorganized to put file information that is frequently accessed together in a single block or adjacent blocks. In yet another embodiment, the external cache may be pre-populated proactively from a file system as a background process.

Figure 5:
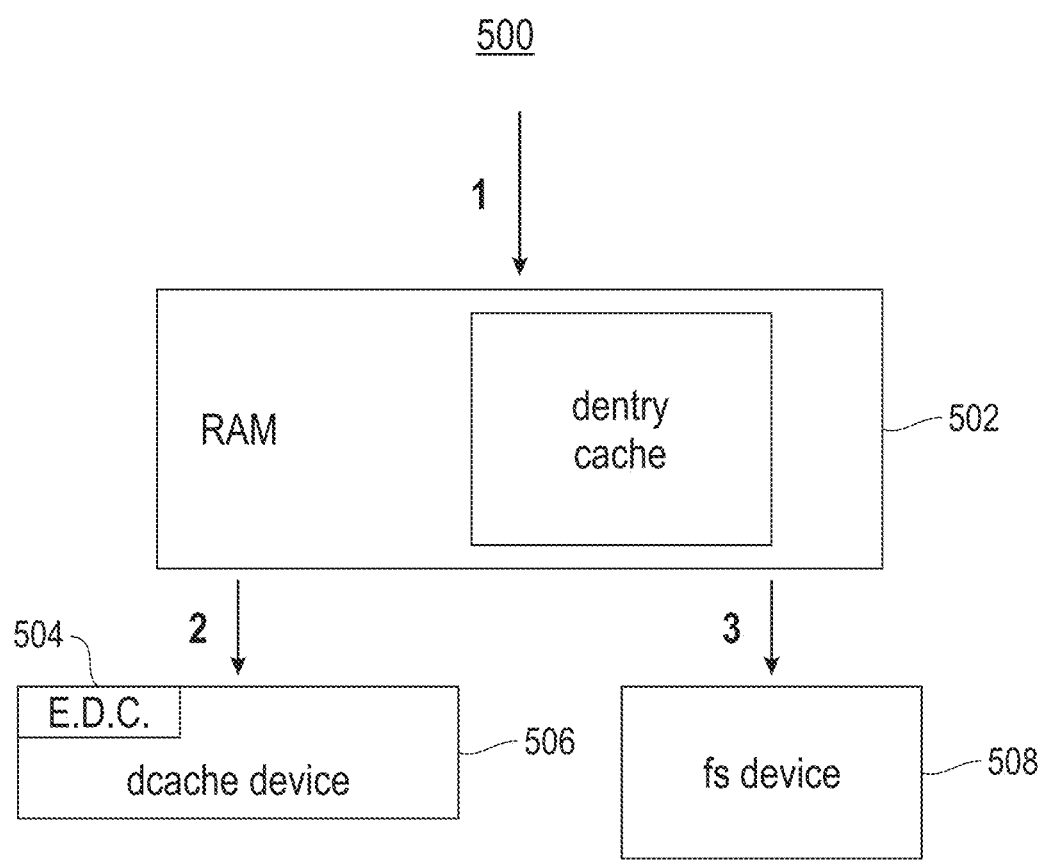
FIG. 5 illustrates an exemplary lookup environment, in accordance with one embodiment.

FIG. 5 illustrates an exemplary lookup environment 500, according to one embodiment. As shown, the environment 500 includes in-memory dentry cache 502, an external dentry cache 504 included within a dcache device 506, and disk storage 508.

In one embodiment, during a lookup, a VFS may first check the in-memory dentry cache 502. In case of a miss at the in-memory dentry cache 502 (e.g., where the in-memory dentry cache 502 does not return the desired path information), the VFS may then check the entries in the external dentry cache 504 at the dcache device 506. If the desired path information is found, then a corresponding inode is returned by the external dentry cache 504 to the VFS.

Further, in one embodiment, if the path is not found (e.g., where the external dentry cache 504 does not return the desired path information), then an underlying file system lookup (e.g., Ext4, XFS, etc.) is performed. For example, the file system lookup may include performing one or more I/O requests to disk storage 508. In another example, for /A/B/C/D/F, first A is looked up in the root directory, then B is looked up in A, then C is looked up in B, D is looked up in C, and finally F is looked up in D. Every I/O request may read one or more directory blocks that contain directory entries. Directory entries may describe the file names and inodes (or inode numbers) of the files residing in this directory.

Further still, in one embodiment, after the underlying file system lookup is performed, the retrieved entries may be put both in the in-memory and secondary dentry cache. In one embodiment, the lookup on the in-memory dentry cache 502 and in the external dentry cache 504 may be performed in parallel. Unlike in-memory dentry cache, the dcache device 506 may be organized as a mapping of the whole path to the inode.

Figure 6:
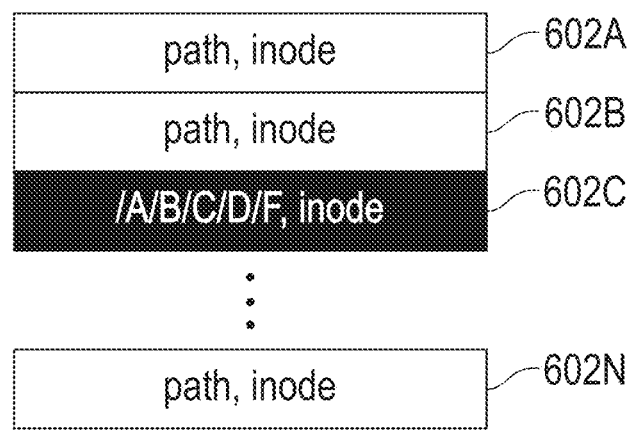
FIG. 6 illustrates an exemplary external cache, in accordance with one embodiment.

FIG. 6 illustrates an exemplary external cache 600, according to one embodiment. As shown, the external cache 600 includes a plurality of entries 602A-N, where each of the plurality of entries 602A-N includes a mapping of an entire path to an inode. For example, entry 602C includes a mapping of the entire path "/A/B/C/D/F" to an inode.

In this way, a translation of arbitrarily deep files names to inodes may be made in a single I/O operation, which may increase the performance of a lookup operation. For example, in one embodiment, an on-disk hash table may be used for storing the entries, and a single I/O operation may bring the whole bucket to the memory.

Additionally, in one embodiment, Unix® systems may implement a VFS layer which may abstract access to specific file systems. In another embodiment, the VFS may be modified to check for entries in the external cache 600. This may allow any existing file system to reap the benefits of fast cached lookups.

Further, in one embodiment, the VFS may be modified to allow file lookups without looking up individual path components. For example, the lookup method may be called with a complete file path as an argument. In another embodiment, internal non-looked-up dentries may be introduced for the intermediate components of the path (e.g., A, B, C, and D in /A/B/C/D/F) because they may not need to be looked up when file F is opened.

Further still, in one embodiment, the VFS may be completely bypassed and a file system may be implemented at a system call level. In another embodiment, a stackable file system may implement the lookups to avoid kernel modifications.

Also, in one embodiment, when files and directories are renamed or removed, corresponding entries in the cache may need to be updated. In another embodiment, this may be achieved by a simple invalidation of all affected entries within the external cache 600. In yet another embodiment, the new names of renamed files may be rehashed within the external cache 600, and inodes may be moved to the new locations.

In addition, in one embodiment, when a directory rename happens, the mappings for all files that belong to the directory may be updated within the external cache 600. In another embodiment, only the directories with a number of files less than a predetermined threshold may be cached. This may allow for a limitation of an overhead associated with renames. In another embodiment, only the directories with a number of path components less than a predetermined threshold may be cached.

Furthermore, in one embodiment, the external cache 600 may either cache inode numbers or complete inodes (e.g., based on one or more user requirements, etc.). In another embodiment, in addition to the inode information, the external cache 600 may store access control information for the whole path. For example, the access control information may be used to decide if the lookup is allowed for a specific user process. In yet another embodiment, when file or directory permissions or ownership changes, corresponding cache entries within the external cache 600 may be invalidated or updated in a manner similar to renaming.

Further still, in one embodiment, the external cache 600 may be configured to store negative dentries (e.g., information about the files that do not exist, etc.). Depending on the workload, a corresponding parameter may be set on or off.

Figure 7:
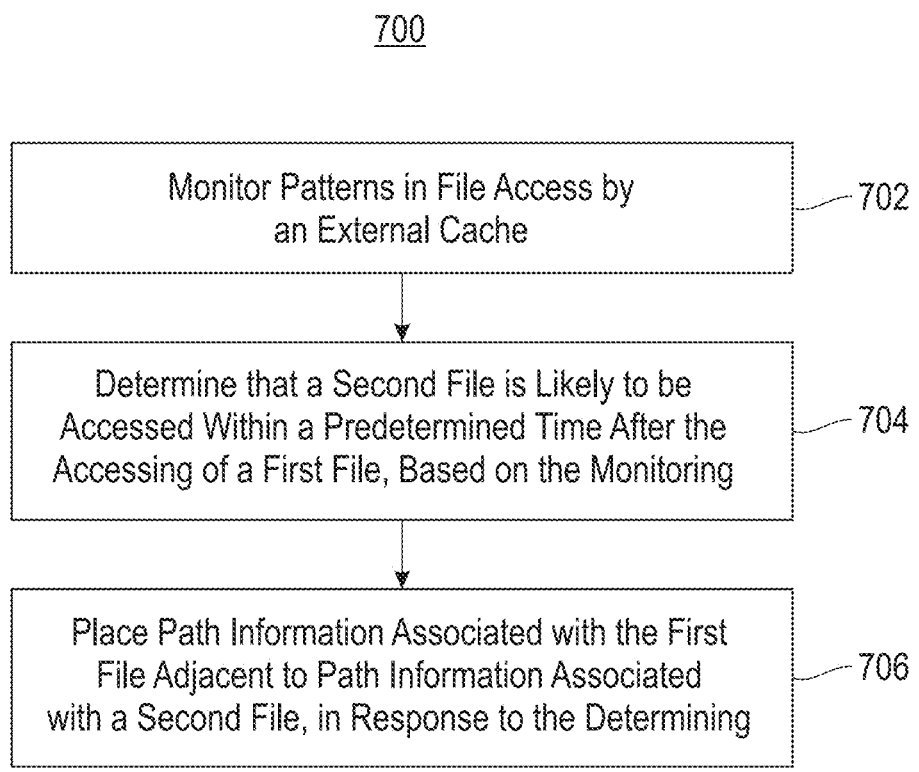
FIG. 7 illustrates a method for performing dynamic reshuffling, in accordance with one embodiment.

Now referring to FIG. 7, a flowchart of a method 700 for performing dynamic reshuffling is shown according to one embodiment. The method 700 may be performed in accordance with the present invention in any of the environments depicted in FIGS. 1-3 and 5-6, among others, in various embodiments. Of course, more or less operations than those specifically described in FIG. 7 may be included in method 700, as would be understood by one of skill in the art upon reading the present descriptions.

Each of the steps of the method 700 may be performed by any suitable component of the operating environment. For example, in various embodiments, the method 700 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 700. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 7, method 700 may initiate with operation 702, where patterns in file access are monitored by an external cache. In one embodiment, the patterns may include the accessing of one or more additional files after initial access of a first file. Additionally, method 700 may proceed with operation 704, where it is determined that a second file is likely to be accessed within a predetermined time after the accessing of a first file, based on the monitoring.

Further, method 700 may proceed with operation 706, where path information associated with the first file is placed adjacent to path information associated with a second file, in response to the determination. For example, entries for files that are frequently accessed together may be placed in the same or adjacent blocks, so that those file entries are brought in memory together. In one embodiment, each entry may include a directory entry including path information associated with a file.

In this way, a single I/O operation may bring into an in-memory cache a plurality of directory entries that are likely to be accessed within a predetermined time of each other.

Further, in one embodiment, a prediction may be made as to what files are likely to be accessed based on one or more environmental variables (e.g., process names, user names, etc.), and the directory entries in the external cache may be reshuffled based on the prediction. In another embodiment, information may be proactively requested from the main system. In yet another embodiment, one or more directory entries may be proactively pushed from the external cache into the in-memory cache.

Further still, in one embodiment, file access patterns may be predictable. For example, when a specific file is accessed there may be an increased chance that a specific subset of other files will be accessed shortly. The external cache may monitor such patterns and may reshuffle directory entries on the external storage device so that a single I/O operation may bring into memory many directory entries that will be accessed within a predetermined time period. In another embodiment, environmental hints (e.g., process and user names) may be used to detect which files are likely to be accessed soon.

Also, in one embodiment, using this mechanism, the external cache may also proactively request directory entries from the main file system device and may also push the entries to the in-memory dentry cache.

Figure 8:
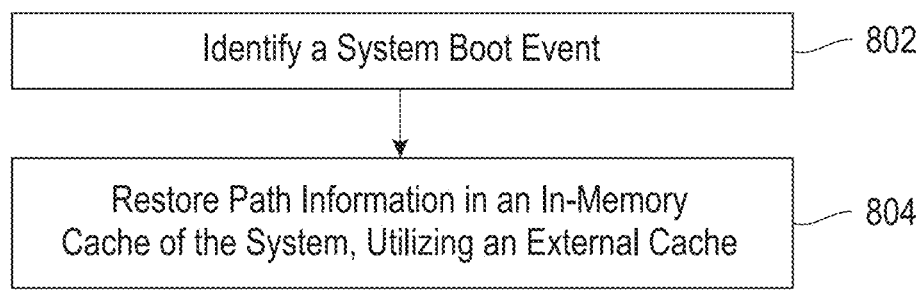
FIG. 8 illustrates a method for performing cache warm-up, in accordance with one embodiment.

Now referring to FIG. 8, a flowchart of a method 800 for performing cache warm-up is shown according to one embodiment. The method 800 may be performed in accordance with the present invention in any of the environments depicted in FIGS. 1-3 and 5-6, among others, in various embodiments. Of course, more or less operations than those specifically described in FIG. 8 may be included in method 800, as would be understood by one of skill in the art upon reading the present descriptions.

Each of the steps of the method 800 may be performed by any suitable component of the operating environment. For example, in various embodiments, the method 800 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 800. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 8, method 800 may initiate with operation 802, where a system boot event is identified. In one embodiment, the system boot event may include a booting of the system, a rebooting of the system, etc. Additionally, method 800 may proceed with operation 804, where path information in an in-memory cache of the system is restored, utilizing an external cache.

In one embodiment, the path information may be transferred from the external cache to the in-memory cache. In another embodiment, the path information may be transferred utilizing sequential I/O operations to stream the path information from the external cache to the in-memory cache. In this way, persistent memory in the external cache may be used to restore (e.g., "warm up") non-persistent memory in the in-memory cache.

In this way, in-memory dentry cache may be extended to secondary storage. In addition to keeping dentries and inodes in main memory (e.g., in an in-memory cache), a VFS may keep path-to-inode mappings on an external storage device (e.g., an external cache in a dcache device). In on embodiment, the dcache device may be faster than the device on which the file system resides (e.g., the file-system device).

Storing path-to-inode mappings on an external storage device may have several advantages. For example, such storage may transparently work with any underlying file system. Additionally, such storage may be indexed by a full path instead of by a path component, which may allow the names to be resolved only in a single I/O irrespective of the path length. Further, such storage may enable I/O operations that fetch more than single dcache entry at a time.

Further still, such storage may track user file accesses and proactively fetch dentries and inodes from the file-system device to the dcache device. Such storage may also push dentries and inodes to the in-memory dentry cache, and reshuffle dentries on the dcache drive so that multiple dentries that are likely to be accessed together can be brought in-memory using a single I/O operation.

Also, after reboot, the secondary storage may allow the VFS to quickly repopulate in-memory dentry cache based on the most recently used or most frequently used dentries. This may shorten the cache warmup period for file systems.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
   identifying an accessing of a file within an operating system;
   checking an in-memory cache for path information associated with the file;
   checking an external cache for the path information associated with the file;
   conditionally retrieving the path information associated with the file by performing a file system lookup and adding the path information associated with the file to the in-memory cache and the external cache;
   returning the path information; and
   reorganizing the external cache to put file information that is frequently accessed together in a single block or adjacent blocks.

2. The computer-implemented method of claim 1, wherein the in-memory cache includes non-persistent memory within a system.

3. The computer-implemented method of claim 1, wherein the path information includes an inode that stores metadata describing a location of the file within one or more disk blocks.

4. The computer-implemented method of claim 1, wherein the external cache is checked upon determining that the in-memory cache does not contain the path information associated with the file.

5. The computer-implemented method of claim 1, wherein the in-memory cache and the external cache are populated in response to file access by one or more users.

6. The computer-implemented method of claim 1, wherein the external cache includes persistent memory.

7. The computer-implemented method of claim 1, wherein the in-memory cache is populated from the external cache during a reboot.

8. The computer-implemented method of claim 1, wherein the external cache contains a mapping of an entire path to an inode for the file.

9. The computer-implemented method of claim 1, wherein the checking of the external cache is performed by a virtual file system (VFS) as part of the file system lookup in response to the accessing of the file.

10. The computer-implemented method of claim 1, wherein the external cache is pre-populated proactively from a file system as a background process.

11. The computer-implemented method of claim 1, wherein the external cache is generic, such that each of a plurality of different file systems utilize the external cache.

12. A computer program product for implementing a secondary storage dentry cache, the computer program product comprising a computer readable storage medium having program instructions embodied therewith, wherein the computer readable storage medium is not a transitory signal per se, the program instructions executable by a processor to cause the processor to perform a method comprising:
 identifying an accessing of a file within an operating system, utilizing the processor;
 checking an in-memory cache for path information associated with the file, utilizing the processor;
 checking an external cache for the path information associated with the file, utilizing the processor;
 conditionally retrieving the path information associated with the file by performing a file system lookup and adding the path information associated with the file to the in-memory cache and the external cache, utilizing the processor;
 returning the path information, utilizing the processor; and
 reorganizing the external cache to put file information that is frequently accessed together in a single block or adjacent blocks, utilizing the processor.

13. The computer program product of claim 12, wherein the in-memory cache includes non-persistent memory within a system.

14. The computer program product of claim 12, wherein the path information includes an inode that stores metadata describing a location of the file within one or more disk blocks.

15. The computer program product of claim 12, wherein the external cache is checked upon determining that the in-memory cache does not contain the path information associated with the file.

16. The computer program product of claim 12, wherein the in-memory cache and the external cache are populated in response to file access by one or more users.

17. The computer program product of claim 12, wherein the external cache includes persistent memory.

18. A system, comprising:
 a processor; and
 logic integrated with the processor, executable by the processor, or integrated with and executable by the processor, the logic being configured to:
 identify an accessing of a file within an operating system;
 check an in-memory cache for path information associated with the file;
 check an external cache for the path information associated with the file;
 conditionally retrieve the path information associated with the file by performing a file system lookup and add the path information associated with the file to the in-memory cache and the external cache;
 return the path information; and
 reorganize the external cache to put file information that is frequently accessed together in a single block or adjacent blocks.

* * * * *